US011615603B2

(12) United States Patent
Deshpande et al.

(10) Patent No.: US 11,615,603 B2
(45) Date of Patent: Mar. 28, 2023

(54) METHOD AND SYSTEM FOR LEARNING SPECTRAL FEATURES OF HYPERSPECTRAL DATA USING DCNN

(71) Applicant: Tata Consultancy Services Limited, Mumbai (IN)

(72) Inventors: Shailesh Shankar Deshpande, Pune (IN); Rohit Thakur, Noida (IN); Balamuralidhar Purushothaman, Bangalore (IN)

(73) Assignee: Tata Consultancy Services Limited, Mumbai (IN)

( * ) Notice: Subject to any disclaimer, the term of this patent is extended or adjusted under 35 U.S.C. 154(b) by 178 days.

(21) Appl. No.: 17/201,710

(22) Filed: Mar. 15, 2021

(65) Prior Publication Data

US 2022/0138481 A1  May 5, 2022

(30) Foreign Application Priority Data

Oct. 30, 2020 (IN) .............................. 202021047520

(51) Int. Cl.
*G06V 10/00*  (2022.01)
*G06V 10/143*  (2022.01)
(Continued)

(52) U.S. Cl.
CPC ........ *G06V 10/143* (2022.01); *G06F 18/2413* (2023.01); *G06F 18/2431* (2023.01);
(Continued)

(58) Field of Classification Search
CPC .. G06N 3/0454; G06N 20/00; G06K 9/00523; G06K 9/627; G06T 7/246;
(Continued)

(56) References Cited

U.S. PATENT DOCUMENTS

2018/0365820 A1\* 12/2018 Nipe ..................... G06K 9/628

FOREIGN PATENT DOCUMENTS

EP  3716136 A1 \* 9/2020 ........... G06K 9/0014

OTHER PUBLICATIONS

Fahim Irfan Alam et al, Triplet Constrained Deep Feature Extraction for Hyperspectral Image Classification, 9th Workshop on Hyperspectral Image and Signal Processing: Evolution in Remote Sensing (WHISPERS) (pp. 1-5) (Year: 2018).\*

(Continued)

*Primary Examiner* — Nancy Bitar
*Assistant Examiner* — Xiao Liu
(74) *Attorney, Agent, or Firm* — Finnegan, Henderson, Farabow, Garrett & Dunner, LLP (57) ABSTRACT

The embodiments herein provide a method and system that analyzes the pixel vectors by transforming the pixel vector into two-dimensional spectral shape space and then perform convolution over the image of graph thus formed. Method and system disclosed converts the pixel vector into image and provides a DCNN architecture that is built for processing 2D visual representation of the pixel vectors to learn spectral and classify the pixels. Thus, DCNN learn edges, arcs, arcs segments and the other shape features of the spectrum. Thus, the method disclosed enables converting a (Continued)

spectral signature to a shape, and then this shape is decomposed using hierarchical features learned at different convolution layers of the disclosed DCNN at different levels.

11 Claims, 6 Drawing Sheets

(51) Int. Cl.
    *G06V 10/25*     (2022.01)
    *G06V 10/40*     (2022.01)
    *G06F 18/2413*     (2023.01)
    *G06F 18/2431*     (2023.01)
    *G06N 3/045*     (2023.01)
    *G06V 10/58*     (2022.01)

(52) U.S. Cl.
    CPC .............. *G06N 3/045* (2023.01); *G06V 10/25* (2022.01); *G06V 10/40* (2022.01); *G06V 10/58* (2022.01)

(58) Field of Classification Search
    CPC .. G06T 7/13; G06T 7/33; G06T 9/002; G06V 10/25; G06V 10/143; G06V 10/44; G06V 10/454; G06V 10/56; G06V 10/774; G06V 10/764; G06V 10/7715; G06V 10/58; G06V 10/426; G06V 10/7635
    See application file for complete search history.

(56) References Cited

OTHER PUBLICATIONS

Deng et al, Hyperspectral Image Classification with Capsule Network Using Limited Training Samples, Sensors (Basel, Switzerland), 18(9), 3153 (Year: 2018).*
Yang et al, RS-CapsNet an Advanced Capsule Network, IEEE Access, vol. 8, pp. 85007-85018 (Year: 2020).*
Punjabi et al, Examining the Benefits of Capsule Neural Networks, ARXIV ID: 2001.10964, Jan. 29 (Year: 2020).*
Ghasem Abdi et al., "Spectral-spatial feature learning for hyperspectral imagery classification using deep stacked sparse autoencoder," Journal of Applied Remote Sensing, Aug. 2017, vol. 11, Issue 4, SPIE digital library, https://core.ac.uk/downoad/pdf/132840767.pdf.
Feng Gao et al., "Spectral and Spatial Classification of Hyperspectral Images Based on Random Multi-Graphs," Remote Sensing, 2018, vol. 10, Issue 8, MDPI, https://www.mdpi.com/2072-4292/10/8/1271/pdf.
Ce Zhang et al., "Joint Deep Learning for Land Cover and Land Use Classification," Remote Sensing of Environment, 2019, Research gate, https://core.ac.uk/download/pdf/198587946.pdf.

\* cited by examiner

METHOD AND SYSTEM FOR LEARNING SPECTRAL FEATURES OF HYPERSPECTRAL DATA USING DCNN

PRIORITY CLAIM

This U.S. patent application claims priority under 35 U.S.C. § 119 to Indian patent application no. 202021047520, filed on 30 Oct. 2020. The entire contents of the aforementioned application are incorporated herein by reference.

TECHNICAL FIELD

The embodiments herein generally relate to hyperspectral image analysis and, more particularly, to a method and system for learning spectral features of hyperspectral data using Deep Convolutional Neural Networks (DCNN).

BACKGROUND

Deep convolutional neural networks (DCNN) applied on images learn spatial features of the images automatically. In the common architectures deployed, the spectral features (that is depth information) are ignored in the convolution process. Learning spectral features automatically is important in analyzing the hyperspectral images and there is increasing interest in accounting of spectral information (depth information) in the convolutional processing. However, most of the existing methods for hyperspectral data classification treat pixel as a n dimensional vector (n=no. of bands) and separate convolution is performed over the depth information. These features are stacked together with spatial convolutional features and are used for further processing. However, semantics of the learned spectral feature are completely ignored and are not interpretable in these approaches.

SUMMARY

Embodiments of the present disclosure present technological improvements as solutions to one or more of the above-mentioned technical problems recognized by the inventors in conventional systems. For example, in one embodiment, a method for learning spectral features of hyperspectral data using Deep Convolutional Neural Networks (DCNN) is provided.

The method comprises receiving a hyperspectral imagery of a region of interest (ROI). A hyperspectral data corresponding to the hyperspectral imagery comprises a plurality of pixel vectors corresponding to every spatial position in the hyperspectral imagery.

Further, the method comprises generating a plurality of 2D representations for the plurality of pixel vectors, wherein for every pixel vector the 2D representation comprises values of each pixel in the pixel vector plotted against corresponding spectrum in the hyperspectral imagery to generate a 2D graph. Each 2D graph captures spectral features of a corresponding pixel vector among the plurality of pixel vectors.

Furthermore, the method comprises generating a plurality of 2D graph images from a visual representation obtained from the plurality of 2D representations.

Thereafter, the method comprises processing the plurality of 2D graph images by a DCNN model to learn the spectral features from a plurality of activation points in each of the plurality of 2D graphs, wherein the plurality of activation points comprise edges, arcs and arc segments that represent a plurality of significant spectral variations in the ROI.

Furthermore, the method comprises utilizing the DCNN model, which has learnt the spectral features, to extract spectral features of a current hyperspectral data of the ROI by generating the plurality of 2D graph images; and classifying the plurality of 2D graph images generated from the current hyperspectral data of the ROI into at least one class among a plurality of predefined classes in accordance with the current spectral features extracted.

In another aspect, a system for learning spectral features of hyperspectral data using Deep Convolutional Neural Networks (DCNN) is provided. The system comprises a memory storing instructions; one or more Input/Output (I/O) interfaces; and one or more hardware processors coupled to the memory via the one or more I/O interfaces, wherein the one or more hardware processors are configured by the instructions to receive a hyperspectral imagery of a region of interest (ROI). A hyperspectral data corresponding to the hyperspectral imagery comprises a plurality of pixel vectors corresponding to every spatial position in the hyperspectral imagery.

Further the one or more hardware processors are configured to generate a plurality of 2D representations for the plurality of pixel vectors, wherein for every pixel vector the 2D representation comprises values of each pixel in the pixel vector plotted against a corresponding spectrum in the hyperspectral imagery to generate a 2D graph. Each 2D graph captures spectral features of a corresponding pixel vector among the plurality of pixel vectors.

Furthermore, the one or more processors are configured to generate a plurality of 2D graph images from visual representation obtained from the plurality of 2D representations.

Thereafter, the one or more processors are configured to process the plurality of 2D graph images via a DCNN model to learn the spectral features from a plurality of activation points in each of the plurality of 2D graphs, wherein the plurality of activation points comprise edges, arcs and arc segments that represent a plurality of significant spectral variations in the ROI.

Furthermore the one or more processors are configured to utilize the DCNN model, which has learnt the spectral features, to extract spectral features of current hyperspectral data of the ROI by generating the plurality of 2D graph images; and classify the plurality of 2D graph images generated from the current hyperspectral data of the ROI into at least one class among a plurality of predefined classes in accordance with the current spectral features extracted.

In yet another aspect, there are provided one or more non-transitory machine-readable information storage mediums comprising one or more instructions, which when executed by one or more hardware processors causes a method for learning spectral features of hyperspectral data using Deep Convolutional Neural Networks (DCNN).

The method comprises receiving a hyperspectral imagery of a region of interest (ROI). A hyperspectral data corresponding to the hyperspectral imagery comprises a plurality of pixel vectors corresponding to every spatial position in the hyperspectral imagery.

Further, the method comprises generating a plurality of 2D representations for the plurality of pixel vectors, wherein for every pixel vector the 2D representation comprises values of each pixel in the pixel vector plotted against corresponding spectrum in the hyperspectral imagery to generate a 2D graph. Each 2D graph captures spectral features of a corresponding pixel vector among the plurality of pixel vectors.

Furthermore, the method comprises generating a plurality of 2D graph images from a visual representation obtained from the plurality of 2D representations.

Thereafter, the method comprises processing the plurality of 2D graph images by a DCNN model to learn the spectral features from a plurality of activation points in each of the plurality of 2D graphs, wherein the plurality of activation points comprise edges, arcs and arc segments that represent a plurality of significant spectral variations in the ROI.

Furthermore, the method comprises utilizing the DCNN model, which has learnt the spectral features, to extract spectral features of a current hyperspectral data of the ROI by generating the plurality of 2D graph images; and classifying the plurality of 2D graph images generated from the current hyperspectral data of the ROI into at least one class among a plurality of predefined classes in accordance with the current spectral features extracted.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Convolutional neural networks (CNNs) are advantageous as they learn the features and classification model simultaneously. In the case of image classification or segmentation, the learned features are spatial features (like edges, arcs, convex shapes etc.) and are interpretable. The feature maps at lower (closer to input) layers show primitive image features such as edges with different orientations. The feature maps at different higher-levels show higher level features such as arcs, shapes, and object parts, respectively. Thus, the features show the parts or whole of primal sketch progressively and are consistent with visual semantics. Often, the spatial dimensions (row and columns) of an image are convolved to build the hierarchical features and spectral dimension is ignored. There is increasing interest to use CNN for hyperspectral image (HSI) classification. Spectral dimension is more important for images such as hyperspectral. However, most of the deep learning architectures ignore spectral information. Recent work on CNN application to HS imagery attempts to incorporate the spectral information.

Early work by Zabalza et al. (2015) used a two layered architecture to reduce the dimensionality of the spectral signature. They represent the spectral signature segment by autoencoder and then stack segment wise representations to represent a complete spectrum. The idea was to understand importance of the few segments (of the spectrum, a wavelength range), which were selected using covariance matrix. Dai et al. (2015) used the representation of the spectrum as a row or column vector was found useful to understand the deep features in waveform. There architecture did not use 4096 dimensional fully connected layer. Instead, an average pooling layer was used. This representation of a hyperspectral pixel is common in literature.

Zhao et al. (2016) used, in their related work, different dimensionality reduction technique to reduce the dimensions of the HS data. The deep spatial feature for a HS pixel were learned using a small window around the pixels. The deep features and reduced HS features were stacked together for further classification. In these approaches the spectral features were selected using standard dimensionality reduction techniques and no neural transformation was performed over an input spectrum. Instead of using dimensionality reduction methods such as PCA or BLDE, Abdi et al. (2017) represent the spectrum using deep autoencoders. They are stacked together with PCA spatial features from the window around the given pixel and processed further.

Mou et al. (2017) treats spectrum of a pixel as a sequence of correlated values. They use RNN to label the spectrum. Each recurrent unit of the network is trained using inputs from a particular band in the sequence (grey values of a spectrum for each band) and the output from the previous network. Thus, it attempts to capture the spectral relation between grey values of the two consecutive bands in the spectrum. The proposed network by Gao et al. (2018) learns a set of features using APs (probably from a grey image of each band). And then each feature is processed by a CNN block parallelly. Finally, the features learned by CNN are stacked together to learn the labels (of the pixel) using SoftMax.

Arun et al. (2019) use similar approach (Zhang et al., Abdi, et al., Zhao et al.). They use stacked feature vectors from spectral and spatial features learned using convolutional network. The capsule network is used to process the stacked feature vectors. In an alternative implementation the spectral features are learned using CapsuleNets. However, the capsules which are supposed to identify primitive features (and its hierarchy of other features in spectral domain) do not perform that task. They do not explain the role of capsule played in detecting spectral features/primitive if any. The elaborate discussion is necessary as the CapsuleNet is designed to learn the structure of primitives by dynamic routing. In absence of such explanation the improvement may be a happy accident.

As can be seen in the literature, convolution is performed over a n-dimensional pixel vector where n=number of bands. The pixel vector is stacked vertically or horizontally, and convolution is performed over the length of the vector. Additionally, spatial features are stacked up together with spectral features and the joined vectors are processed further. Thus, it is supposed to learn the deep features in spectral domain. However, the features extracted by the spectral convolution (in this manner) are difficult to interpret in spectral domain. For example, spatial convolution learns features that represent edges, arcs, shapes etc. Similarly, spectral features are a few specific wavelengths, diagnostic absorption or reflections, a specific shape of the spectral signature at a given position and so on. None of the approaches used in the current literature (barring a few) attempts to address this problem. They do not focus on spectral features and its interpretation like the spatial features in spatial domain. Convolution over a one-dimensional spectral vector is not interpretable. Because they seem to learn discontinuities in pixel vector for a given receptive field. Visualizing the same is again a challenging task as the vector is one dimensional. Building hierarchy of these spectral features as disclosed herein for spatial features is challenging. Furthermore, the results are shown on dataset like Pavia which is having very high spatial resolution. Most of the accuracy improvement for such a high-resolution dataset is because of spatial features. Whether the vector based spectral convolution is useful in medium to coarse resolution imagery needs to be investigated further (as the spatial features are absent in such cases). The systemic mechanism of spectral and spatial feature learning for imagery with dominant spectral features such as HSI is required.

In contrast to that, the alternative mechanisms that can extract semantically consistent/interpretable spectral features are a) one-dimensional convolution by a kernel dedicated for a different wavelength segments, possibly each one without sharing any weights. For example, the kernel extended over an entire range (or fully connected layers with neurons equal to number of bands) in first convolutional layer (a single kernel) would learn significance of different wavelengths and so on; b) two-dimensional convolution over shape, that is, a graph of a spectrum in xy space, or line diagram of a spectral signature. The latter is more intuitive for multiple reasons. When an expert analyzes the spectrum of a given material, he observes the shape of the spectrum at various wavelength positions, that is, the diagnostic absorption, convexity of the curve, slope at different positions or over a wavelength range etc. Furthermore, when there are no specific diagnostic features for given materials, the expert comprehends and compares entire spectrum shape for discriminating the materials. The shape of parts or whole of the spectrum are intuitively useful. The shape features such as edges, arcs and arc segments formed by joining multiple arcs show a hierarchy of the features as well. Thus, the representation would further aid in architecting robust Capsule Network.

Embodiments herein provide a method and a system for learning spectral features of hyperspectral data using Deep Convolutional Neural Networks (DCNN). As well known in art, hyperspectral imaging collects and processes information from across the electromagnetic spectrum to obtain the spectrum for each pixel in the image of a scene (ROI). The hyperspectral data is analyzed further to classify the hyperspectral data to identify features of interest in the ROI. The hyperspectral data associated with hyperspectral images received for any Region of Interest (ROI) is in the form of number of pixel vectors. Unlike conventional methods in the art that treat this pixel vector as a time series, the method disclosed herein analyzes the pixel vectors by transforming the pixel vector into two-dimensional spectral shape space (images which are 2D signals) and then performs convolution over the image of graph (2D signal) thus formed. The intuition is to learn the spectral features as represented by the shape of a spectrum or in other words the features which a spectroscopy expert uses to interpret the spectrum. Thus, the filters now learn edges, arcs, arcs segments and the other shape features of the spectrum as applicable. Further, the method disclosed provides a DCNN architecture that is built for processing 2D visual representation of the pixel vectors to learn spectral features and classify the pixels. The method focuses on spectral features and classification on the hyperspectral data received, is performed at the pixel level without any spatial contextual information. However, extending the application to incorporate extracting of spatial features with minimal modifications to the approach disclosed herein is to be understood by a person skilled in the art to lie well within the scope of the disclosed method.

Thus, the method disclosed enables converting a spectral signature to a shape, and then this shape is decomposed using hierarchical features learned at different convolution layers of the disclosed DCNN at different levels. This is like recognizing handwritten digits using its images. With the approach of vector to 2D visual transformation, the DCNN architecture learns the spectral features that are consistent with the spectral interpretation. The features learned by the DCNN would be similar to spectral signature features and domain expert seek identifying the material corresponding to the signature. With experiments conducted on various CNN architectures to compare learning of spectral features from 2D visual representation of a pixel vector as compared to learning of spectral features directly from the pixel vector (as is carried out in conventional methods) reveal that the 2D visual representation as an input to the CNN provides better extraction of spectral features as compared to 'pixel vector' input. The same is reflected in the experimental results section later.

Referring now to the drawings, and more particularly to FIGS. 1 through 4, where similar reference characters denote corresponding features consistently throughout the figures, there are shown preferred embodiments and these embodiments are described in the context of the following exemplary system and/or method.

Figure 1:
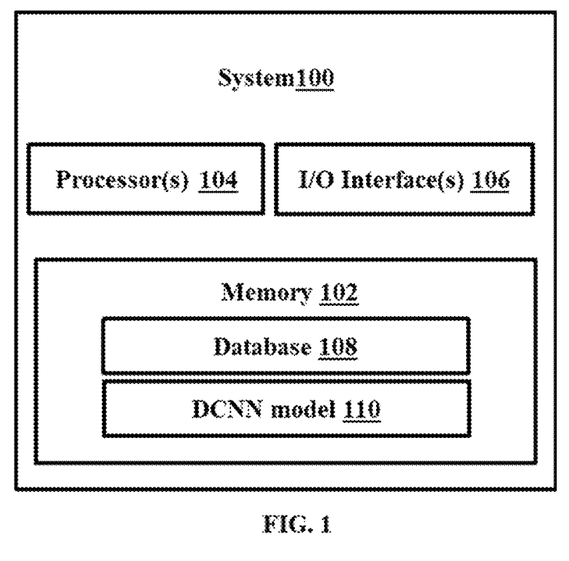
FIG. 1 is a functional block diagram of a system for learning spectral features of hyperspectral data using Deep Convolutional Neural Networks (DCNN), in accordance with some embodiments of the present disclosure.

FIG. 1 is a functional block diagram of a system 100, for learning spectral features of hyperspectral data using Deep Convolutional Neural Networks (DCNN), in accordance with some embodiments of the present disclosure.

In an embodiment, the system 100, includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface and the like and can facilitate multiple communications within a wide variety of networks N/W and protocol types, including wired networks, for example, LAN, cable, etc., and wireless networks, such as WLAN, cellular, or satellite to receive the hyperspectral data and communicate to external devices classification results of the hyperspectral data based on the spectral features extracted by a DCNN model 110 in the memory 102, which is executed via the one or more hardware processors. In an embodiment, the I/O interface(s) 106 can include one or more ports for connecting to a number of external devices or to another server or devices.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 102 may include the database 108 comprising the received hyperspectral data and classified hyperspectral data. The memory 102 may comprise information pertaining to input(s)/output(s) of each step performed by the processor(s) 104 of the device 100 and methods of the present disclosure. In an embodiment, the database 108 may be external (not shown) to the system 100 and coupled to the system via the I/O interface 106. Functions of the components of the system 100 are explained in conjunction with flow diagram of FIG. 2 and architecture of the disclosed DCNN model 110 in FIGS. 3A through 3C.

Figure 2:
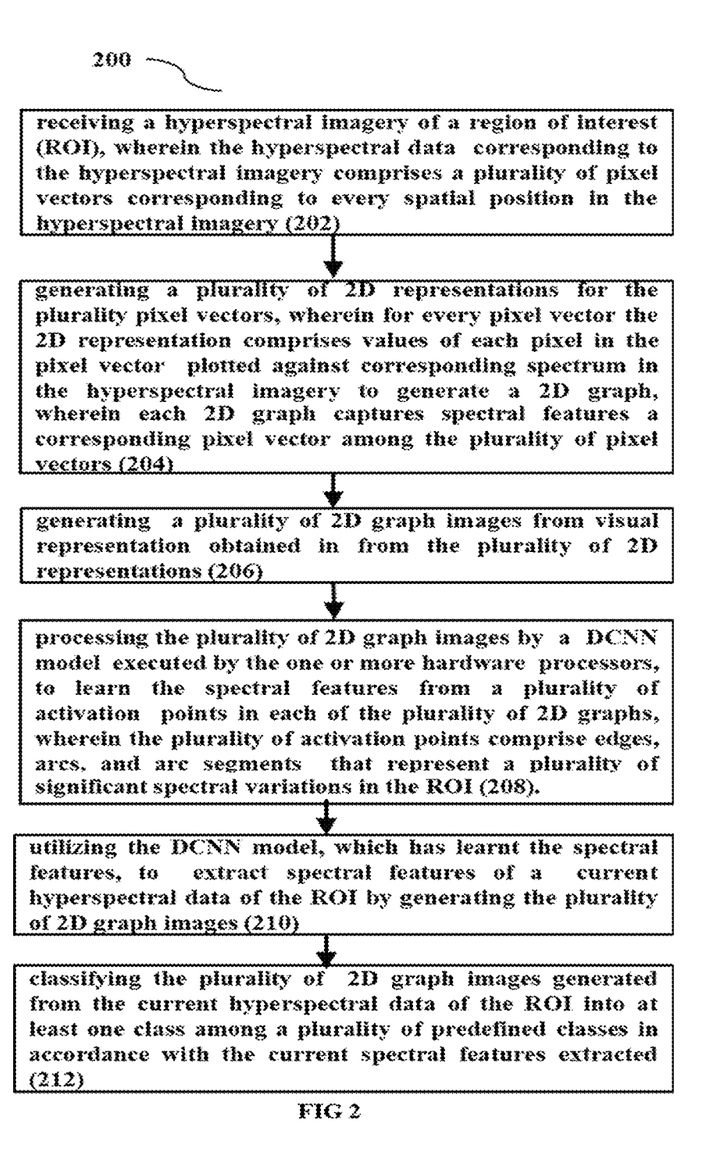
FIG. 2 is a flow diagram illustrating a method for learning spectral features of hyperspectral data using Deep Convolutional Neural Networks (DCNN), using the system of FIG. 1, in accordance with some embodiments of the present disclosure.
Figure 3A:
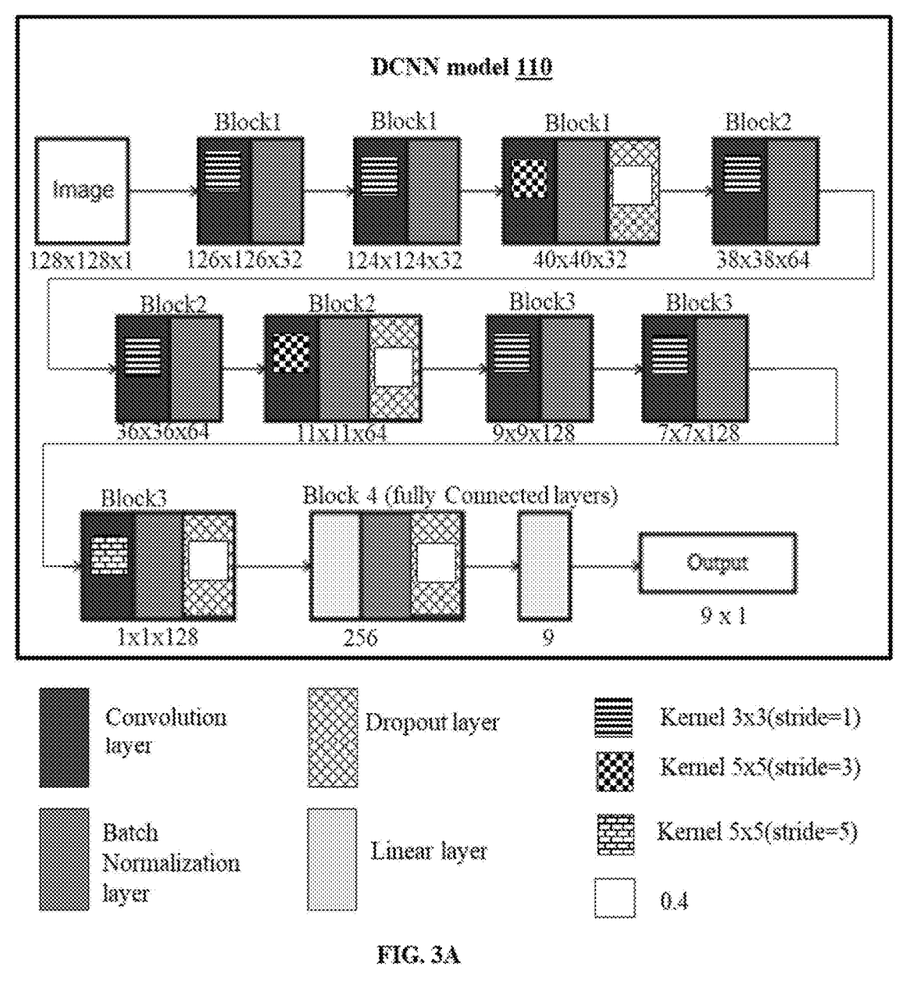
FIG. 3A illustrates an example architecture of the DCNN for learning spectral features of hyperspectral data from input images (2D signals), in accordance with some embodiments of the present disclosure.
Figure 3B:
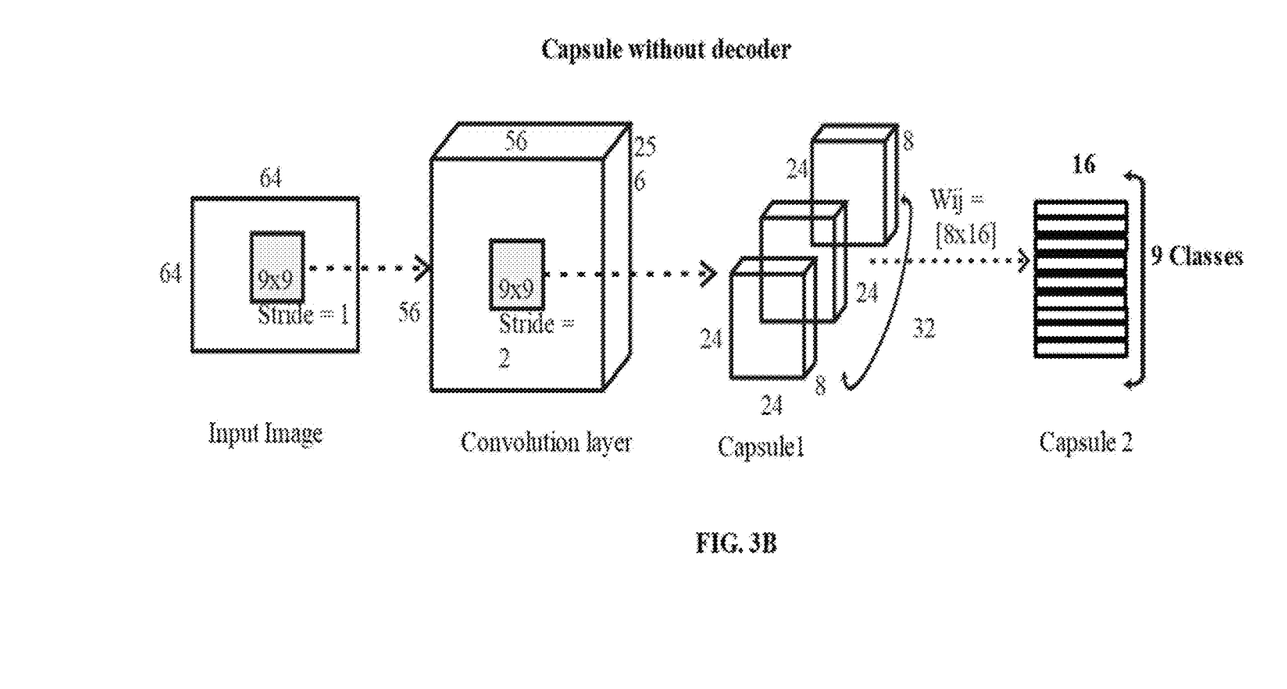
FIGS. 3B and 3C illustrate alternative implementations for DCNN using capsule networks for learning spectral features of hyperspectral data from input images (2D signal), in accordance with some embodiments of the present disclosure.
Figure 3C:
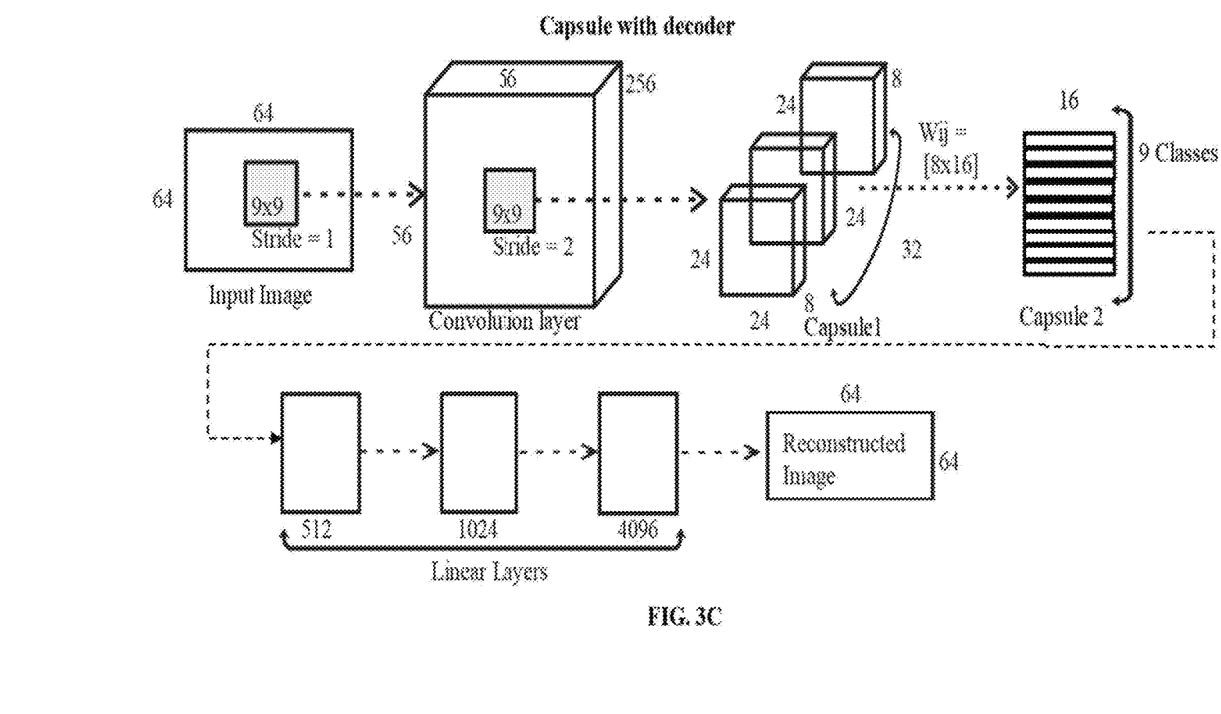

FIG. 2 is a flow diagrams illustrating a method 200 for, using the system 100 of FIG. 1, in accordance with some embodiments of the present disclosure. In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in FIG. 1 and the steps of flow diagram as depicted in FIG. 2 and the DCNN architecture as depicted in FIG. 3A through FIG. 3C. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring to the steps of the method 200, at step 202, the one or more hardware processors 104 are configured to receive a hyperspectral imagery of a region of interest (ROI). The hyperspectral data corresponding to the hyperspectral imagery comprises a plurality of pixel vectors corresponding to every spatial position in the hyperspectral imagery.

Figure 4:
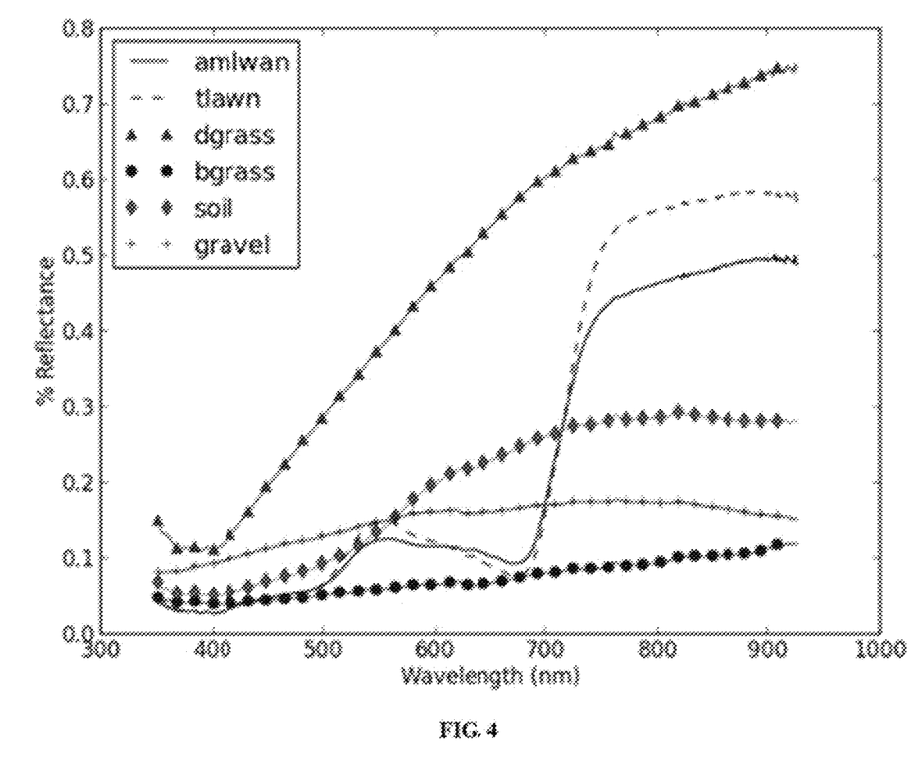
FIG. 4 is an example depicting 2D visual representation of pixel vector which is fed to the DCNN for learning the spectral features, in accordance with some embodiments of the present disclosure.

Once the pixel vectors are obtained, at step 204, the one or more hardware processors 104 are configured to generate a plurality of 2D representations for the plurality of pixel vectors. In an embodiment, for every pixel vector the 2D representation comprises values of each pixel in the pixel vector plotted against corresponding spectrum in the hyperspectral imagery to generate a 2D graph, wherein each 2D graph captures spectral features of a corresponding pixel vector among the plurality of pixel vectors. An example 2D graph generated from the pixel vector is depicted in FIG. 4 and the spectral features or spectral information of the ROI captured in the 2D graph image is explained.

Once the 2D representations for each pixel vector is obtained it is fed to the DCNN, at step 206, the one or more hardware processors 104 are configured to generate a plurality of 2D graph images from visual representations obtained from the plurality of 2D representations.

In an embodiment, the 2D representation or the spectral signature may not necessarily be a line graph but a segmented image, wherein boundary of segments in the image is indicative of the spectral signature or the line graph.

At step 208, the one or more hardware processors 104 are configured to process the plurality of 2D graph images via the DCNN model 110 for to learning the spectral features from a plurality of activation points in each of the plurality of 2D graphs. The plurality of activation points comprise edges, arcs and arc segments that represent a plurality of significant spectral variations in the ROI such as diagnostic absorption or reflections and the like. FIG. 4

Example architecture implementation of the DCNN model 110 is explained in conjunction with FIG. 3A. Further, in an alternative embodiment the DCNN can be implemented using the capsule networks (CapsuleNets). Possible CapsuleNets alternative implementations of DCNN for spectral feature extraction and classification are explained in conjunction with FIGS. 3B and 3C.

Once the DCNN model 110 has learnt the spectral features, then at step 210, the one or more hardware processors 104 are configured to utilize the DCNN model 110 to extract spectral features of current hyperspectral data (test hyperspectral data) of the ROI by generating the plurality of 2D graph images. At step 212, the one or more hardware processors 104 are configured to classify the plurality of 2D graph images generated from the current hyperspectral data (test hyperspectral data) of the ROI into at least one class among a plurality of predefined classes in accordance with the spectral features extracted. Thus, all pixel vectors in a single class exhibit similar spectral features and belong to same segment in the ROI.

In an embodiment, a triplet loss function is used to classify the extracted current spectral features into the plurality of classes by formulating the problem of spectral classification similar to matching of an subject in an image data collection. The weights of the network are learned in such a manner that the distance between similar pair is reduced and distance between dissimilar pair is increased.

In an example, the classes can be predefined in accordance with spectral characteristics exhibited by different materials of interest such as concrete, vegetation cover etc. to analyze the hyperspectral imagery and classify the various segments in the ROI.

In an embodiment, in one implementation, the DCNN model 110 comprises a plurality of convolution blocks cascaded to fully connected layers. Each of the plurality of convolution blocks comprises a plurality of convolution layers with each of the plurality of convolution layers followed by a batch normalization layer. A kernel size and corresponding stride of each of initial convolution layers among the plurality of convolution layers is less than the kernel size and the corresponding stride of a last convolution layer among the plurality of convolution layers. The value of the stride is designed to enable kernel to sample 2D graph images without overlapping. Further, the last convolution layer among the plurality of convolution layers is followed by a dropout layer, which prevents overfitting and enables generalization. Generalization is learning capability to handle variation in the actual test images or test data.

A first fully connected layer and a second fully connected layer cascaded to the last convolution block, of the plurality of convolution block. The first fully connected layer is a dense layer comprising of a dense set of units and the second fully connected layer comprising a sparse set of units, wherein a number of units in the sparse set of units is based on a number of the plurality of predefined classes for classification of the extracted current spectral features.

As mentioned earlier, the DCNN model can be implemented using the capsule network finetuned to handle 2D signal (input 2D graph images). The capsule network comprises a convolution layer followed by a cascaded first capsule layer and a second capsule layer. The convolution layer is followed by a RELU activation layer and detects basic low level features in each of the plurality of 2D graph images, in the image. The first capsule layer comprises a first set of capsules which processes low level features detected by the convolution layer to produce combination of the low level features and generate a set of first feature vectors. The second capsule layer comprises a second set of capsules equal to the number of predefined classes and processes the first set of features to classify each of the plurality of 2D graph images into one of the predefined classes. The capsule network utilizes a squash activation function and is followed by a decoder that manages reconstruction loss. The capsule network is explained in conjunction with FIGS. 3B and 3C.

FIG. 3A illustrates one way of implementation of the DCNN model 110 for learning spectral features of hyperspectral data from input images (2D signals, visual representation of pixel vectors), in accordance with some embodiments of the present disclosure. Unlike existing CNN architectures such as 'Waveform architecture for 1d (1d wav)', the DCNN model 110 is built without max pooling as max pooling loses information while reducing the size. In spectral domain or for spectral shape, losing information would be more detrimental as it may lose diagnostic absorption or reflection, which is important for interpreting spectroscopic features/spectral features. Further, size selected kernels for the DCNN 110 are optimal and are selected in accordance to end application. Optimal size is critical for classification accuracy and is very specific to the end application the data is analyzed for, example material classification and the like. The size of the image formed from the 2D representation (2D graph of the pixel vector) is also important parameter. Herein the image is of size 128×128. However, the method provides configurable image size, and can be decided based on spectral data with different number of bands. Further, higher layer convolution layer have strides designed in such a manner that the convolution kernel samples image without any overlap, thus reducing the sampling space.

In an example architecture of FIG. 3A, a (103,1) dimension spectral signature a pixel vector among the plurality of pixel vectors received in the hyperspectral data for the ROI is converted to a line chart. Here 103 refers to number of bands of the spectrum over which the hyperspectral data is collected. An image of the line chart is provided as input to the DCNN model 110. The size of the image generated is 128×128×1. For the 103 band hyperspectral data, 128×128 was identified to be the best fit size. The DCNN architecture comprises four parts. There are 3 blocks of convolution layers, which are followed by 1 block of fully connected layer. Each block of convolution consists of 3 convolution layers and each convolution layer is followed by a batch normalization layer. The last convolution layer of each block is also followed by the dropout layer. Dropout is used as it prevents the DCNN from over-fitting thus helping the DCNN generalize better. The first 2 convolution layer in each block have kernel size of 3×3 and the last convolution layer of each block has kernel size of 5×5 with a stride of 3 in first two blocks and stride of 5 in the last block. 2 convolution layers of 3×3 are used instead of using one convolution layer of 5×5 because that can mimic 5×5 by using two consecutive 3×3 layers and this will bring more nonlinearity. The max pooling is not used in the DCNN model 110 since in the process of max pooling, lots of important information is lost. Furthermore, the parameters in max pooling are not learnable parameters. So instead of using max pooling layer to subsample the data, the method utilizes the convolution layer with strides 3 and 5 for sub-sampling. Each convolution layer of all the convolution blocks consists of 32, 64, 128 feature maps, respectively. The fully connected block of the network consists of 2 fully connected layers. The first fully connected dense layer consists of 256 units whereas the second fully connected layer has 9 units, identified based on the number of class the classifier id expected to have. A Rectified Linear Unit (RELU) is used as the activation function for all the layers in the DCNN. A SoftMax activation is used in the last layer so the model gives the probability that the input image (generated for each pixel vector) is of which class. One hot encoding is performed over the label so that the loss between the predicted and actual value can be calculated using the categorical cross entropy loss function. Categorical cross entropy compares prediction distribution with the true distribution, where the true class is represented as a one-hot encoded vector, and the closer the predictions are to that vector, the lower the loss. A Stochastic gradient descent (SGD) is used with learning rate of 0.01 and momentum of 0.5 as SGD with momentum tends to reach better optima and has better generalization than adaptive optimizers as in the work by Ashia C et al. titled 'The Marginal Value of Adaptive Gradient Methods in Machine Learning'. Table 1 below provides the architectural details of DCNN model 110 of FIG. 3A.

TABLE 1

| Number | Layer | Feature Map | Size | Kernel Size | Stride | Padding | Activation |
|---|---|---|---|---|---|---|---|
| Input | Image | 1 | 128 × 128 × 1 | — | — | — | — |
| 1 | Convolution 2D | 32 | 126 × 126 × 32 | 3 × 3 | 1 | 0 | relu |
|  | Batch Normalization 2D | 32 | 126 × 126 × 32 | — | — | — | — |
| 2 | Convolution 2D | 32 | 124 × 124 × 32 | 3 × 3 | 1 | 0 | relu |
|  | Batch Normalization 2D | 32 | 124 × 124 × 32 | — | — | — | — |
| 3 | Convolution 2D | 32 | 40 × 40 × 32 | 5 × 5 | 3 | 0 | relu |
|  | Batch Normalization 2D | 32 | 40 × 40 × 32 | — | — | — | — |
|  | Dropout | — | 0.4 | — | — | — | — |
| 4 | Convolution 2D | 64 | 38 × 38 × 64 | 3 × 3 | 1 | 0 | relu |
|  | Batch Normalization 2D | 64 | 38 × 38 × 64 | — | — | — | — |
| 5 | Convolution 2D | 64 | 36 × 36 × 64 | 3 × 3 | 1 | 0 | relu |
|  | Batch Normalization 2D | 64 | 36 × 36 × 64 | — | — | — | — |
| 6 | Convolution 2D | 64 | 11 × 11 × 64 | 5 × 5 | 3 | 0 | relu |
|  | Batch Normalization 2D | 64 | 11 × 11 × 64 | — | — | — | — |
|  | Dropout | — | 0.4 | — | — | — | — |
| 7 | Convolution 2D | 128 | 9 × 9 × 128 | 3 × 3 | 1 | 0 | relu |
|  | Batch Normalization 2D | 128 | 9 × 9 × 128 | — | — | — | — |
| 8 | Convolution 2D | 128 | 7 × 7 × 128 | 3 × 3 | 1 | 0 | relu |
|  | Batch Normalization 2D | 128 | 7 × 7 × 128 | — | — | — | — |
| 9 | Convolution 2D | 128 | 1 × 1 × 128 | 5 × 5 | 5 | 0 | relu |
|  | Batch Normalization 2D | 128 | 1 × 1 × 128 | — | — | — | — |
|  | Dropout | — | 0.4 | — | — | — | — |
| 10 | Linear | — | 256 | — | — | — | relu |
|  | Batch Normalization 1D | — | 256 | — | — | — | — |
|  | Dropout | — | 0.4 | — | — | — | — |
| Output | Linear | — | 9 | — | — | — | SoftMax |

FIGS. 3B and 3C illustrate alternative architecture for implementation for DCNN using capsule networks with and without decoders for learning spectral features of hyperspectral data, in accordance with some embodiments of the present disclosure.

The architecture of the capsule network disclosed herein, fine tunes the existing CapsuleNets to better learn spectral features from 2d visual representation (images) of the pixel vector rather than the pixel vector itself.

The capsule network disclosed herein is specifically designed to identify primitives and build semantically coherent association between primitives in two convolution layers. That is edges and their corresponding shapes formed by them are associated using dynamic routing or expectation maximization algorithm. This behavior is not spectrally reproduced by the existing CapsuleNets reported in literature as they use pixel vector in deep processing. However, the method disclosed enables building semantically sensible hierarchy of spectral features because of the transformation of one-dimensional vector to two-dimensional spectral signature.

The capsule network of FIG. 3B, can be divided into 3 parts, comprising a convolution layer at the start followed by 2 capsule layers. The model takes the image as input and encodes into a 16 dimensional vector. The first part consists of convolution layer and detects basic low level feature in the image. This layer consists of 256 kernels with size of 9×9 and stride of 1. The convolution layer is followed by a RELU activation layer. Second part of the architecture is a first capsule layer. The input to this layer is a 56×56×256 feature vector from the previous convolution layer. This layer has 32 capsule (a first set of capsules) where each capsule applies eight 256 kernels with size of 9×9 and stride of 2. These capsules take the low level features detected by the previous convolution layer and produces combination of those features. The output of each capsule is a 24×24×8 feature vector and since there are 32 such capsules so the output of the whole capsule layer is be 24×24×8×32 feature vector. This feature vector is be passed to the second capsule layer. Since there are total 9 classes to predict in the example dataset under consideration, therefore this second capsule layer has 9 capsules (equal to number of predefined classes) one for each class. Each capsule takes 24×24×8×32 feature vector as input which can also be said as 24×24×32 8 dimensional vectors. Each of these 8 dimension vectors get mapped to 16 dimension vector by 8×16 weight matrix layer. The output of the model is a 16×9 feature vector. A squash activation function is used in the capsule layer since the standard activation functions typically work on scalar values and normalizing each element in a vector so that it falls between certain range (in case of SoftMax 0 and 1). However, in case of capsule net instead of scalar elements of vector, need is to normalize the magnitude of vectors. So basically, squash normalizes the values between 0 and 1 and make sure that the positional information located in higher dimensions vector is not destroyed in this normalization. A margin loss is used, which is similar to Support Vector Machine (SVM) loss. In margin loss if object of a class is present in the image then the squared length of the corresponding vector of that object capsule must not be less than 0.9. Similarly, if that object of that class is not present in the image, then the squared length of the corresponding vector of that object should not be more than 0.1. ADAM is used with learning rate of 0.001 to reach better optima. The architecture details of each layer of the capsule network without a decoder (FIG. 3B) is provided in table 2 below.

FIG. 3C depicts capsule network with decoder, in accordance with some embodiments of the present disclosure. Table 3 below provides the architectural details for the capsule network with decoder that is fine tuned for learning spectral features.

TABLE 3

| Feature Map | Size | Kernel Size | Stride | Padding | Activation | Capsule |
|---|---|---|---|---|---|---|
| 1 | 64 × 64 × 1 | — | — | — | — | |
| 256 | 56 × 56 × 256 | 9 × 9 | 1 | 0 | relu | |
| 32 | 24 × 24 × 32 | 9 × 9 | 2 | 0 | squash | Capsule 1 Output(8 × 18432) |
| 32 | 24 × 24 × 32 | 9 × 9 | 2 | 0 | | |
| 32 | 24 × 24 × 32 | 9 × 9 | 2 | 0 | | |
| 32 | 24 × 24 × 32 | 9 × 9 | 2 | 0 | | |
| 32 | 24 × 24 × 32 | 9 × 9 | 2 | 0 | | |
| 32 | 24 × 24 × 32 | 9 × 9 | 2 | 0 | | |
| 32 | 24 × 24 × 32 | 9 × 9 | 2 | 0 | | |
| 9 | 24 × 24 × 32 | | | | squash | (Capsule 2 Output(16 × 9)) × 3 iterations for routing |
| — | 512 | — | — | — | relu | Decoder |
| — | 1024 | — | — | — | relu | |
| — | 4096 | — | — | — | sigmoid | |

The basic architecture of capsule net with decoder is same as the normal capsule net. As the name suggest in this

TABLE 2

| Number | Layer | Feature Map | Size | Kernel Size | Stride | Padding | Activation | Capsule |
|---|---|---|---|---|---|---|---|---|
| Input | Image | 1 | 64 × 64 × 1 | — | — | — | — | |
| 1 | Convolution 2D | 256 | 56 × 56 × 256 | 9 × 9 | 1 | 0 | relu | |
| 2 | Convolution 2D | 32 | 24 × 24 × 32 | 9 × 9 | 2 | 0 | squash | Capsule 1 Output(8 × 18432) |
| 3 | Convolution 2D | 32 | 24 × 24 × 32 | 9 × 9 | 2 | 0 | | |
| 4 | Convolution 2D | 32 | 24 × 24 × 32 | 9 × 9 | 2 | 0 | | |
| 5 | Convolution 2D | 32 | 24 × 24 × 32 | 9 × 9 | 2 | 0 | | |
| 6 | Convolution 2D | 32 | 24 × 24 × 32 | 9 × 9 | 2 | 0 | | |
| 7 | Convolution 2D | 32 | 24 × 24 × 32 | 9 × 9 | 2 | 0 | | |
| 8 | Convolution 2D | 32 | 24 × 24 × 32 | 9 × 9 | 2 | 0 | | |
| 9 | Convolution 2D | 32 | 24 × 24 × 32 | 9 × 9 | 2 | 0 | | |
| 10 | Capsule 2 | 9 | 24 × 24 × 32 | — | — | — | squash | (Capsule 2 Output(16 × 9)) × 3 iterations for routing | version of the network just a decoder layer is added at the end of the network. This means is that the output of the second capsule layer, which is 16×9, is passed to the decoder layer. Decoder takes the 16 dimensional vector and learns to decode it into the input image. Decoder only uses the correct vector from the 16×9 vector during training and ignores the incorrect ones. Decoder is used as a regularizer, it takes the output of the correct vector from capsule two as input and learns to recreate an image with Euclidean distance between the reconstructed image and the input image as the loss function. It helps the capsule network to learn features that are useful for reconstructing the original image. In this way the reconstructed image is closer to the actual image. Decoder layer consists of 3 fully connected layers. The fully connected dense layer consists of 512,1024,4096 units, respectively. First One taking 16×9 as input from the last capsule layer and the last one giving 4096 as the output which is equal to the dimension of the original input image i.e. 64×64×1. In this version of the capsule net the total loss of the model is the sum of Margin Loss+alpha*Reconstruction Loss. Here, the value of alpha taken is 0.0005. The architecture of capsule network without decoder is provided in table 3 below.

FIG. 4 is an example depicting 2D visual representation of pixel vectors, which is fed to the DCNN for learning the spectral features, in accordance with some embodiments of the present disclosure.

As depicted in FIG. 4, line graphs of pixel vectors provide spectral signature (or spectrum of solar energy reflected) by a specific pixel at each wavelength. Multiple 2D or line graphs for different pixels from different locations is depicted in the figure. The spectral signature is generally unique for each material and depends upon the molecular structure of the material. The spectra features are represented by two ways 1) by specific diagnostic absorption or reflection at a given wavelength range for example, vegetation signature has red absorption or high infrared reflection 2) in case it is missing entire shape also may provide uniqueness that is how a graph line varies over an entire range. For example, soil signature, it shape entail soil material. For example, concrete, its flatness is indicative of the material concrete. The DCNN 110 learns the variations in the line graph (edges, arcs, segments, and the like) or the overall variation of the line graph, referred as activation points. These activation points represent the significant spectral features of the ROI.

Experimentation Results: Multiple classification experiments were conducted using the DCNN model 110 depicted in FIG. 3A through 3C. The dataset used was well known Paiva university dataset of hyperspectral image. Pavia university image was used. It has 103 bands and spatial resolution is 1.3 m. The image contains 9 classes namely asphalt, meadows, gravel, trees, painted metal sheets, bare soil, bitumen, self-blocking bricks, and shadows. Since, the semantics of spectral deep features were of interest, only spectral features of a pixel for classification, by completely ignoring spatial information of the pixel.

The DCNN was compared with two common architectures used for hyperspectral data as depicted in FIG. 4. The pixel vector and spectral shape features were compared for each architecture as well. 5-fold cross validation was performed deploying stratified split to assure that proportions of classes in training and validation data sets are maintained.

TABLE 4

| NN architecture | Pixel vector | Spectrum Shape |
| --- | --- | --- |
| 1D wav: Waveform architecture for 1d signal | 41.00 | NA |
| P1: DCNN of FIG. 3A | 45.00 | 79.56 |
| P2: P1 + Reconstruction loss | 46.73 | 81.24 |
| P3: CapsuleNet with signatures shape (FIG. 3B) | 32.81 | 84.63 |
| P4 cap: P3 Cap + Reconstruction loss (FIG. 3C) | 52.18 | 91.71 |

The transformation of pixel vector of the hyperspectral data to two-dimensional spectral shape as an input to the deep neural network enables learning of spectral features that are semantically interpretable. Deep architecture or the DCNN 110, designed for processing this transformed signature learns the spectral features automatically. The spectral features that are learned in different layers of the convolution reflect the hierarchy of spectral features as well. For example, some of the short arcs of spectral shape learned are common diagnostic features of the signatures. Further if the shape of the signature over a specific wavelength rage is important. it is activated appropriately. Furthermore, the lower level primitives can be successively combined to form the spectral signature (this is analogous to edges>arcs>shapes>object hierarchy build by spatial convolution).

Accuracy comparison tables: From the table 4 the accuracy improvements are evident. Transformed vector provides added advantage over the pixel vector in all the architectures. The improvement is substantial for all the simpler architectures. Furthermore, if the traditional layered architecture is compared with CapsuleNets for the spectral features, CapsuleNets performance is enhanced. This enhancement can clearly be attributed to semantically consistent spectral features learned. It is to be noted that no spatial features are used for classifying Hyperspectral (HS) Pavia image.

Furthermore, preliminary experiments on loss functions suggest the two-way optimization that is SoftMax loss and reconstruction loss help in improving accuracy.

Triplet loss is also suitable for identifying material of given spectral signatures using the match in the spectral library. The formulation can be very similar to finding a match for a given photograph in database of candidates. This is especially desired as the spectral signatures of many urban materials are similar to each other. In this case, maximizing the distance between similar and dissimilar pairs of signatures would be very helpful.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for learning spectral features from hyperspectral data, the method comprising:
    receiving, via one or more hardware processors, a hyperspectral imagery of a region of interest (ROI), wherein the hyperspectral data corresponding to the hyperspectral imagery comprises a plurality of pixel vectors corresponding to each pixel of the plurality of pixel vectors in the hyperspectral imagery;
    generating, via the one or more hardware processors, a plurality of Two Dimensional (2D) representations for the plurality of pixel vectors, wherein for every pixel vector the 2D representation comprises values of each pixel in the pixel vector plotted against a corresponding spectrum in the hyperspectral imagery to generate a 2D graph, wherein each 2D graph captures spectral features of a corresponding pixel vector among the plurality of pixel vectors;
    generating, via the one or more hardware processors, a plurality of 2D graph images from visual representations obtained from the plurality of 2D representations;
    processing the plurality of 2D graph images by a Deep Convolutional Neural Network (DCNN) model executed by the one or more hardware processors, to learn the spectral features from a plurality of activation points in each of the plurality of 2D graphs, wherein the plurality of activation points comprise edges and arcs, that represent reflectance variations in the ROI, and
    converting via the one or more hardware processors, a spectral signature to a shape, wherein the shape is decomposed using hierarchical features learned at a plurality of convolutional layers of the DCNN model at different levels.

2. The method as claimed in claim 1, wherein the method further comprising:
    utilizing the DCNN model to extract current spectral features of a current hyperspectral data of a second ROI by generating a second plurality of 2D graph images; and
    utilizing the DCNN model by classifying the plurality of 2D graph images generated from the current hyperspectral data of the second ROI into at least one class among a plurality of predefined classes in accordance with the extracted current spectral features.

3. The method as claimed in claim 2, wherein the DCNN model comprises:
    a plurality of convolutions blocks
        wherein each of the plurality of convolution blocks comprises the plurality of convolution layers with each of the plurality of convolution layers followed by a batch normalization layer,
        wherein each of the plurality of convolution layers is kernel size and corresponding stride of a last convolution layer among the plurality of convolution layers is greater than the kernel size and the corresponding stride of the remaining convolution layers, wherein a value of the stride is designed to enable a kernel to sample 2D graph images without overlapping, and
        wherein the last convolution layer among the plurality of convolution layers is followed by a dropout layer; and a first fully connected layer and a second fully connected layer cascaded to a last convolution block, of the plurality of convolution blocks, wherein the second fully connected layer is a sparse layer.

4. The method as claimed in claim 2, wherein the DCNN model is a capsule network comprising:
a convolution layer followed by a cascaded first capsule layer the cascaded first capsule layer to be followed by a second capsule layer,
wherein the convolution layer is followed by a RELU activation layer and detects low level features in each of the plurality of 2D graph images,
wherein the first capsule layer comprises a first set of capsules which processes the low level features detected by the convolution layer to produce combination of the low level features and generate a set of first feature vectors,
wherein the second capsule layer comprises a second set of capsules equal to a number of a plurality of predefined classes and processes the set of first features to vector to classify each of the plurality of 2D graph images into one of the plurality of predefined classes.

5. The method as claimed in claim 4, wherein the capsule network utilizes a squash activation function and is followed by a decoder that manages reconstruction loss.

6. A system for learning spectral features from hyperspectral data, the system comprising:
a memory storing instructions;
one or more Input/Output (I/O) interfaces; and
one or more hardware processors coupled to the memory via the one or more I/O interfaces, wherein the one or more hardware processors are configured by the instructions to:
receive a hyperspectral imagery of a region of interest (ROI), wherein the hyperspectral data corresponding to the hyperspectral imagery comprises a plurality of pixel vectors corresponding to each pixel of the plurality of pixel vectors in the hyperspectral imagery;
generate a plurality of Two Dimensional (2D) representations for the plurality of pixel vectors, wherein for every pixel vector the 2D representation comprises values of each pixel in the pixel vector plotted against a corresponding spectrum in the hyperspectral imagery to generate a 2D graph, wherein each 2D graph captures spectral features of a corresponding pixel vector among the plurality of pixel vectors;
generate a plurality of 2D graph images from visual representations obtained from the plurality of 2D representations;
process the plurality of 2D graph images to via a DCNN model to learn the spectral features from a plurality of activation points in each of the plurality of 2D graphs, wherein the plurality of activation points comprise edges and arcs that represent reflectance variations in the ROI, and
converting via the one or more hardware processors, a spectral signature to a shape, wherein the shape is decomposed using hierarchical features learned at a plurality of convolutional layers of the DCNN model at different levels.

7. The system as claimed in claim 6, wherein the one or more hardware processors are configured to:
utilize the DCNN model, to extract spectral current spectral features of a current hyperspectral data of a second ROI by generating a second plurality of 2D graph images; and
utilize the DCNN model by classifying the plurality of 2D graph images generated from the current hyperspectral data of the second ROI into at least one class among a plurality of predefined classes in accordance with the extracted current spectral features.

8. The system as claimed in claim 7, wherein the DCNN model comprises:
a plurality of convolutions blocks,
wherein each of the plurality of convolution blocks comprises the plurality of convolution layers with each of the plurality of convolution layers followed by a batch normalization layer,
wherein each of the plurality of convolutional layers is kernel size and corresponding stride of a last convolution layer among the plurality of convolution layers is greater than the kernel size and the corresponding stride of the remaining convolution layers, wherein a value of the stride is designed to enable a kernel to sample 2D graph images without overlapping, and
wherein the last convolution layer among the plurality of convolution layers is followed by a dropout layer; and
a first fully connected layer and a second fully connected layer cascaded to a last convolution block, of the plurality of convolution blocks, wherein the second fully connected layer is a sparse layer.

9. The system as claimed in claim 7, wherein the DCNN model is a capsule network comprising:
a convolution layer followed by a cascaded first capsule layer and the cascaded first capsule layer followed by a second capsule layer,
wherein the convolution layer is followed by a RELU activation layer and detects low level features in each of the plurality of 2D graph images,
wherein the first capsule layer comprises a first set of capsules which processes the low level features detected by the convolution layer to produce combination of the low level features and generate a set of first feature vectors,
and wherein the second capsule layer comprises a second set of capsules equal to a number of a plurality of predefined classes and processes the set of first vectors features to classify each of the plurality of 2D graph images into one of the plurality of predefined classes.

10. The system as claimed in claim 9, wherein the capsule network utilizes a squash activation function and is followed by a decoder that manages reconstruction loss.

11. One or more non-transitory machine readable information storage mediums comprising one or more instructions, which when executed by one or more hardware processors causes:
receiving a hyperspectral imagery of a region of interest (ROI), wherein the hyperspectral data corresponding to the hyperspectral imagery comprises a plurality of pixel vectors corresponding to each pixel of the plurality of pixel vectors in the hyperspectral imagery;
generating, a plurality of Two Dimensional (2D) representations for the plurality of pixel vectors, wherein for every pixel vector the 2D representation comprises values of each pixel in the pixel vector plotted against a corresponding spectrum in the hyperspectral imagery to generate a 2D graph, wherein each 2D graph captures spectral features of a corresponding pixel vector among the plurality of pixel vectors;

generating, a plurality of 2D graph images from visual representations obtained from the plurality of 2D representations;

processing the plurality of 2D graph images by a Deep Convolutional Neural Network (DCNN) model executed, to learn the spectral features from a plurality of activation points in each of the plurality of 2D graphs, wherein the plurality of activation points comprise edges and arcs that represent reflectance variations in the ROI; and converting via the one or more hardware processors, a spectral signature to a shape, wherein the shape is decomposed using hierarchical features learned at a plurality of convolutional layers of the DCNN model at different levels.

* * * * *